United States Patent
Okuyama et al.

(10) Patent No.: US 6,890,079 B2
(45) Date of Patent: May 10, 2005

(54) METHOD OF MANUFACTURING DIFFERENT TYPES OF IMAGE DISPLAY APPARATUSES AND IMAGE DISPLAY APPARATUS MANUFACTURED BY THE METHOD

(75) Inventors: Atsushi Okuyama, Saitama (JP); Hiroyuki Kodama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/197,841

(22) Filed: Jul. 19, 2002

(65) Prior Publication Data
US 2003/0025886 A1 Feb. 6, 2003

(30) Foreign Application Priority Data
Jul. 30, 2001 (JP) ............................ 2001-229013

(51) Int. Cl.$^7$ ............................ G03B 21/14; G02B 7/02
(52) U.S. Cl. ...................................... 353/100; 359/821
(58) Field of Search ........................... 353/100, 101; 359/811, 819, 821, 823, 827

(56) References Cited

U.S. PATENT DOCUMENTS

| | | | | |
|---|---|---|---|---|
| 4,136,937 A | | 1/1979 | Fettig | 353/27 |
| 4,278,334 A | * | 7/1981 | Maeda | 353/85 |
| 4,907,873 A | | 3/1990 | Kuriyama | 353/101 |
| 5,302,984 A | * | 4/1994 | Kohle et al. | 353/103 |
| 5,537,167 A | * | 7/1996 | Toide et al. | 353/100 |
| 5,993,009 A | * | 11/1999 | Choate | 353/80 |
| 6,139,157 A | | 10/2000 | Okuyuma | 353/102 |
| 6,181,386 B1 | | 1/2001 | Knox | 348/788 |
| 6,257,726 B1 | | 7/2001 | Okuyama | 353/20 |
| 6,406,149 B1 | | 6/2002 | Okuyama | 353/38 |
| 6,547,402 B1 | * | 4/2003 | Masuda | 353/101 |
| 6,587,159 B1 | * | 7/2003 | Dewald | 348/744 |
| 6,616,283 B1 | | 9/2003 | Takano et al. | 353/74 |

FOREIGN PATENT DOCUMENTS

| | | |
|---|---|---|
| JP | 2003-75916 | 3/2003 |
| WO | WO 03/001291 | 1/2003 |

* cited by examiner

*Primary Examiner*—Christopher Mahoney
(74) *Attorney, Agent, or Firm*—Fitzpatrick, Cella, Harper & Scinto

(57) ABSTRACT

A method of manufacturing different types of image display apparatuses includes the steps of producing a lens barrel (housing) for holding optical elements, the lens barrel being commonly usable in the different types of image display apparatuses; selecting one type of image display apparatus to be manufactured among the different types of image display apparatuses; and manufacturing the one type of image display apparatus using the common lens barrel. In the image display apparatus manufactured by the method mentioned above, selective use of retainers for retaining the optical elements included in the illumination system, when arranging at least two different types of the illumination systems varying according to whether or not microlenses are provided, enables the different types of illumination systems to be easily constituted in accordance with the characteristics of image display elements varying according to whether or not microlenses are provided, and so on.

20 Claims, 12 Drawing Sheets

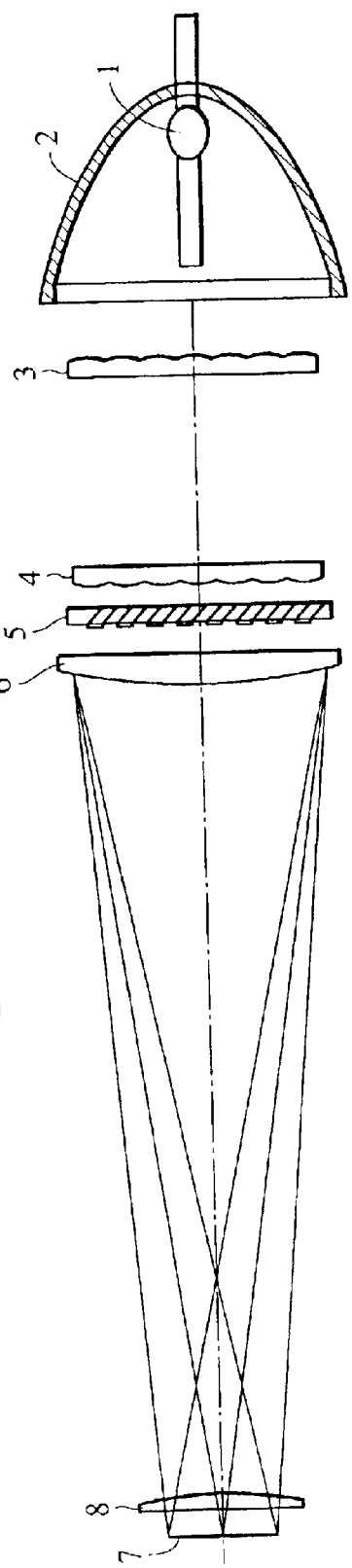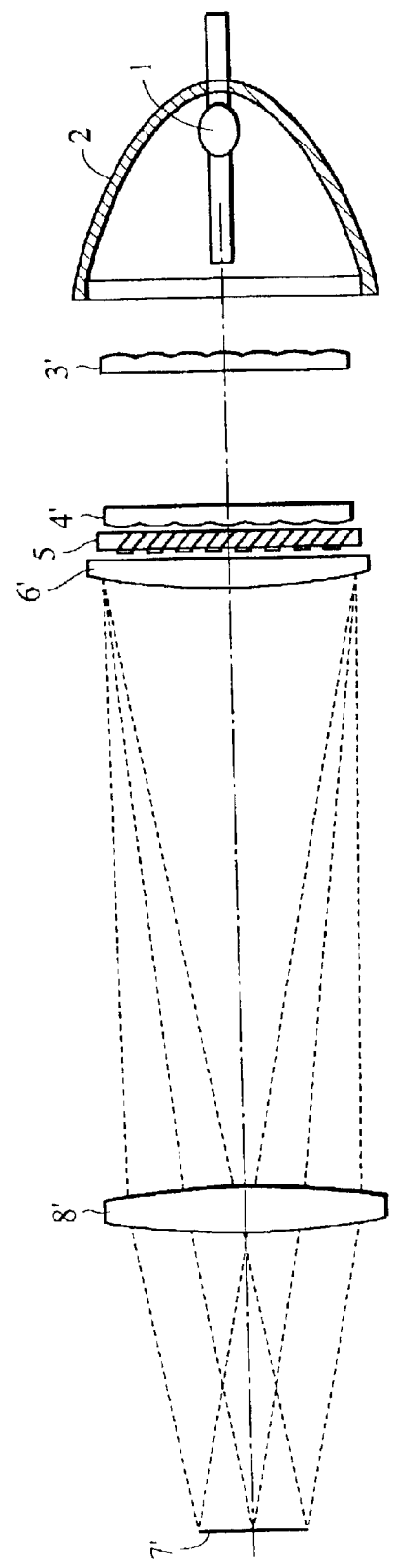
FIG. 1A
FIG. 1B

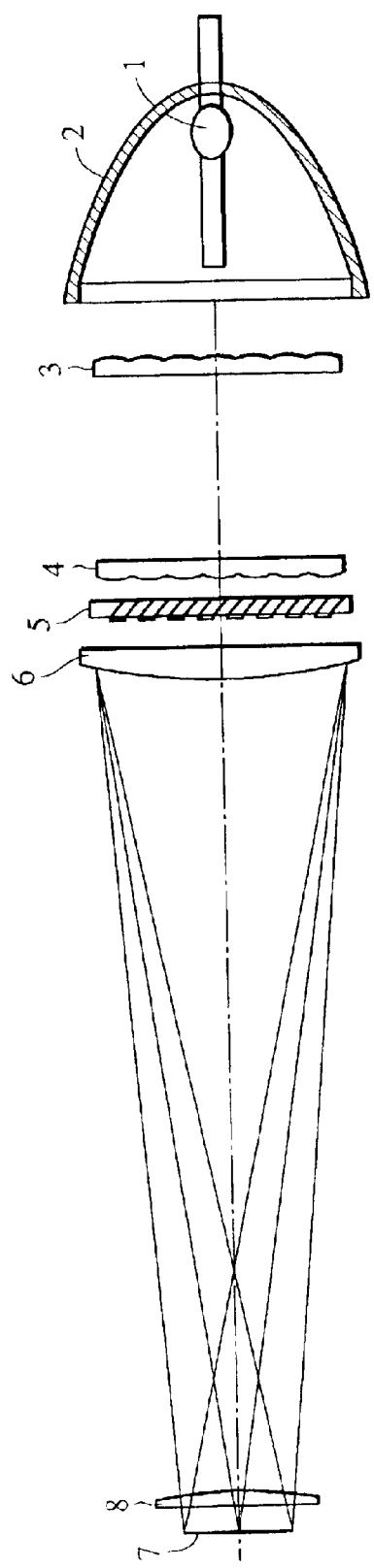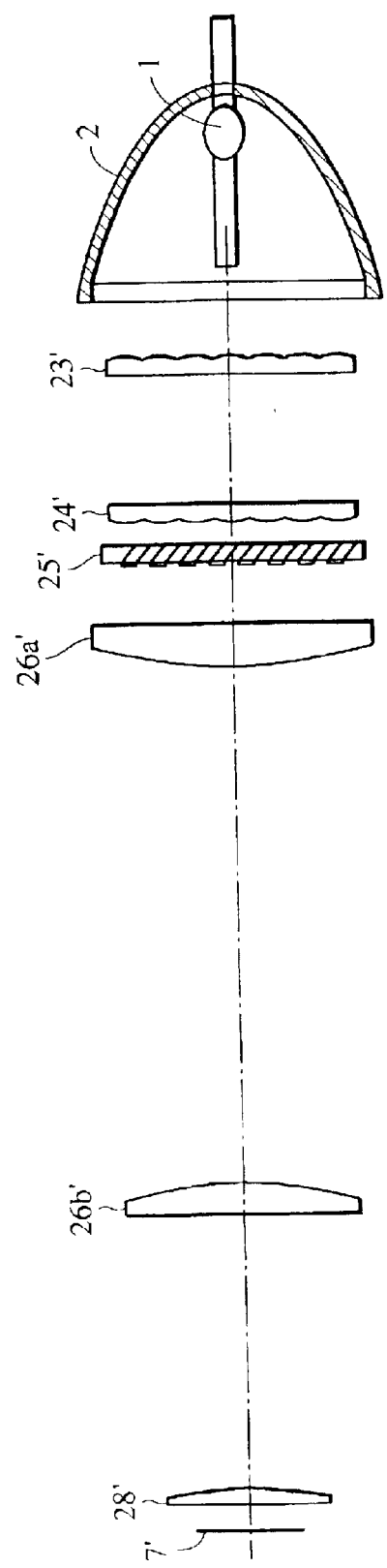
FIG. 3A
FIG. 3B

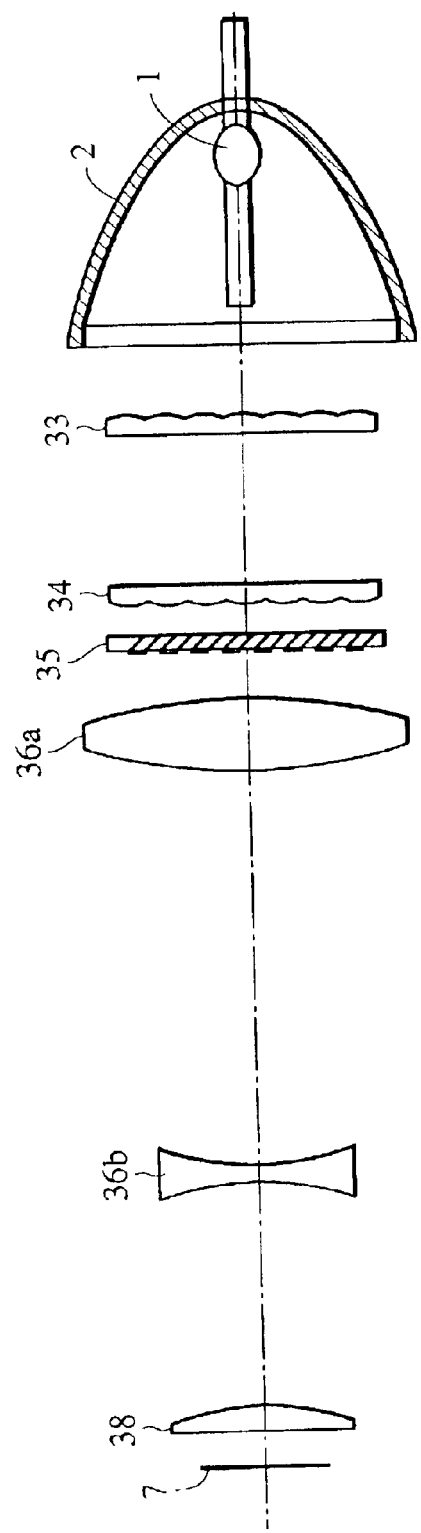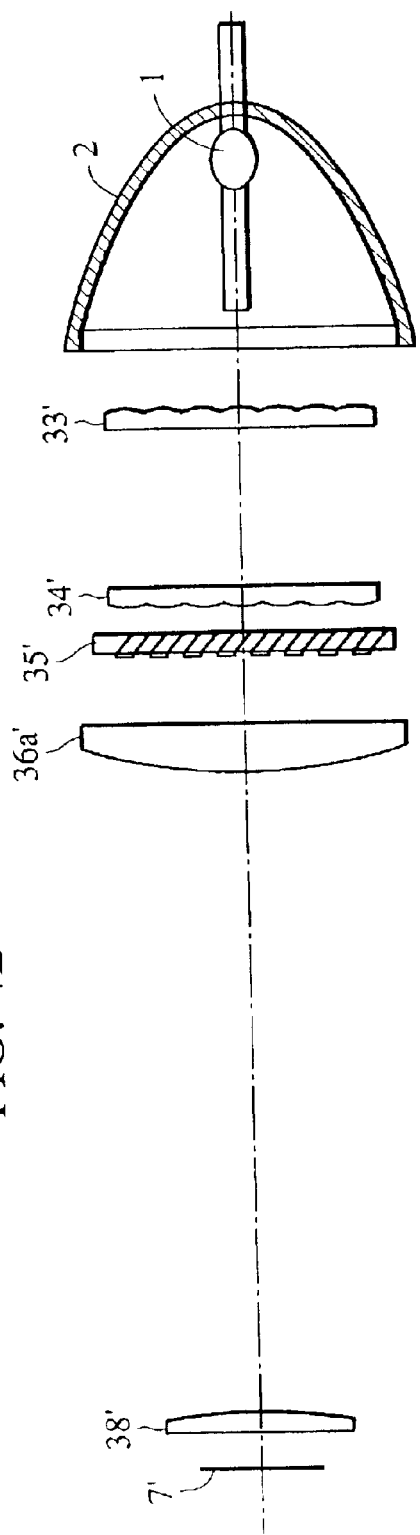
FIG. 4A
FIG. 4B

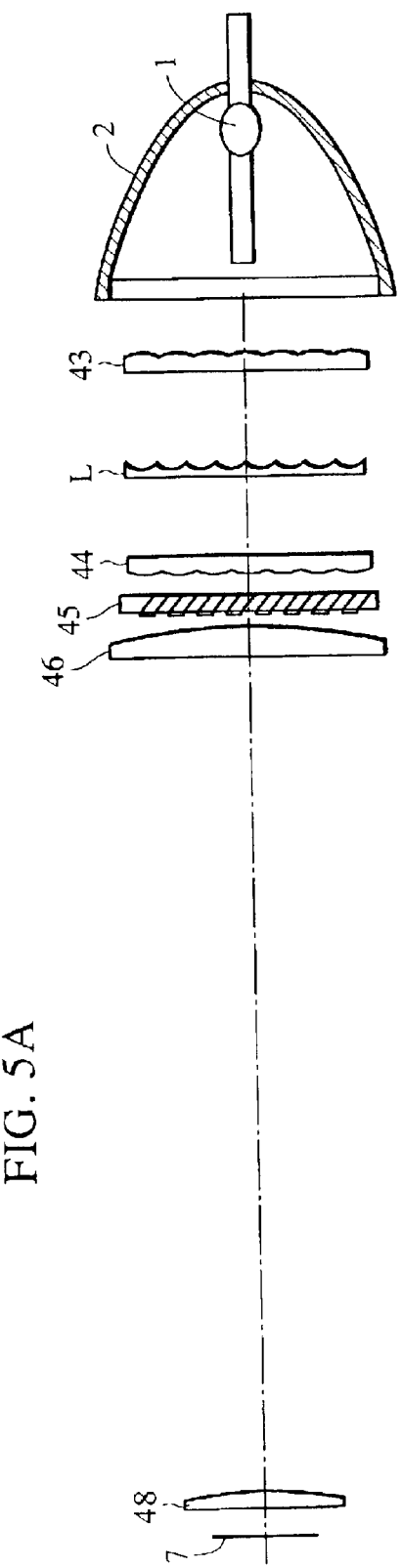
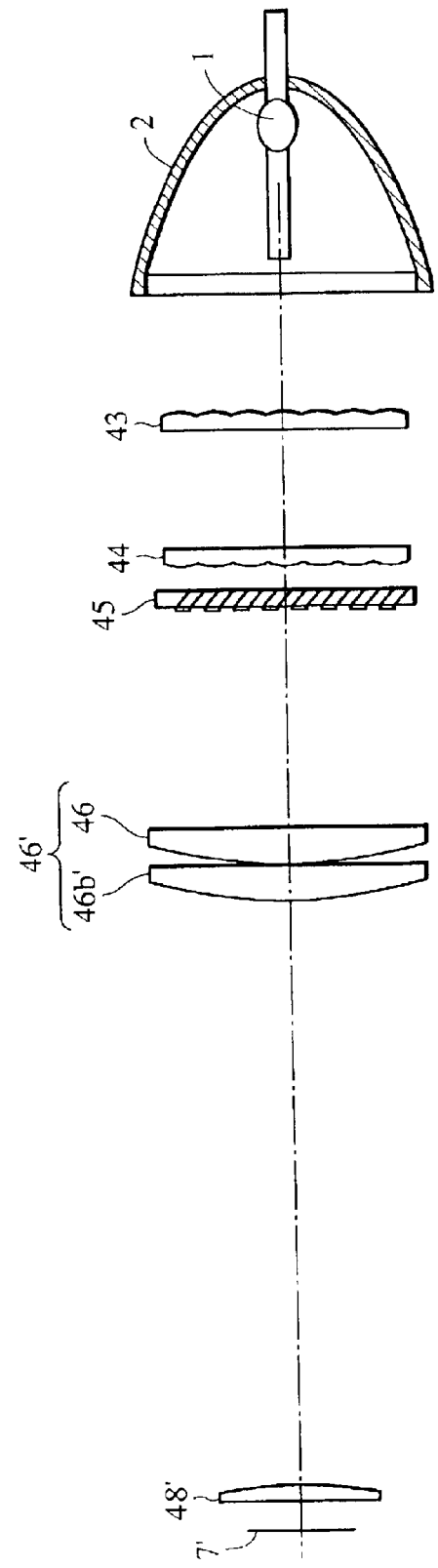
FIG. 5A
FIG. 5B

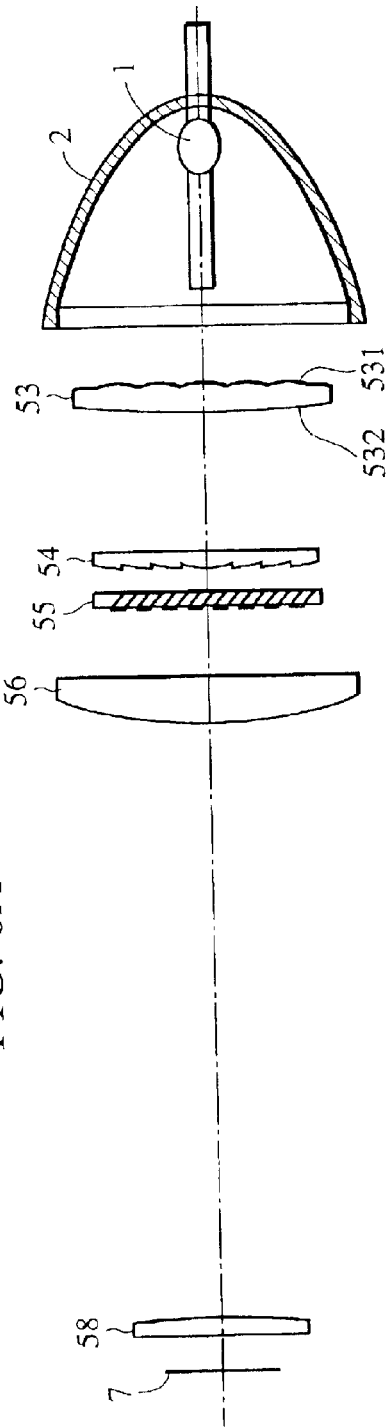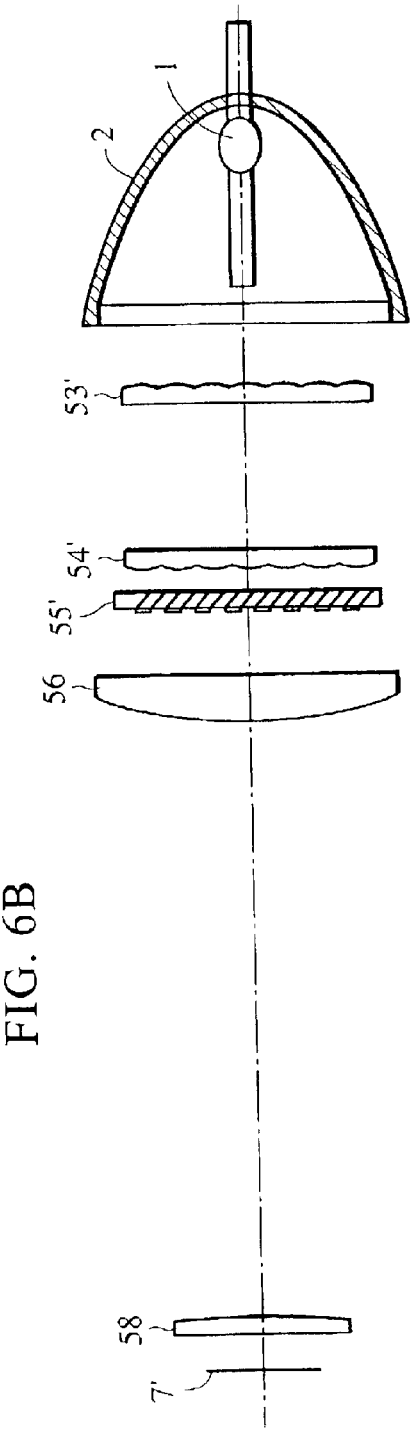

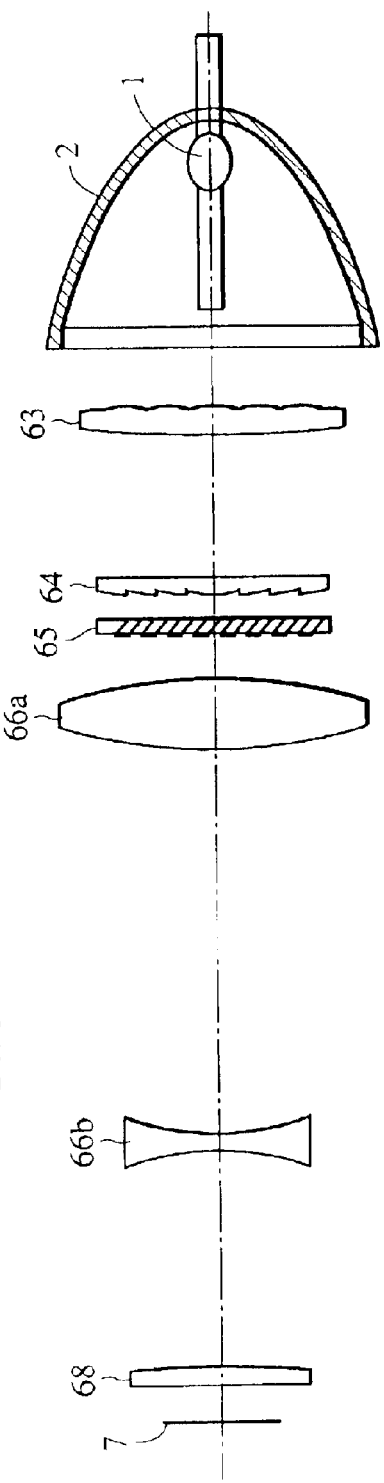
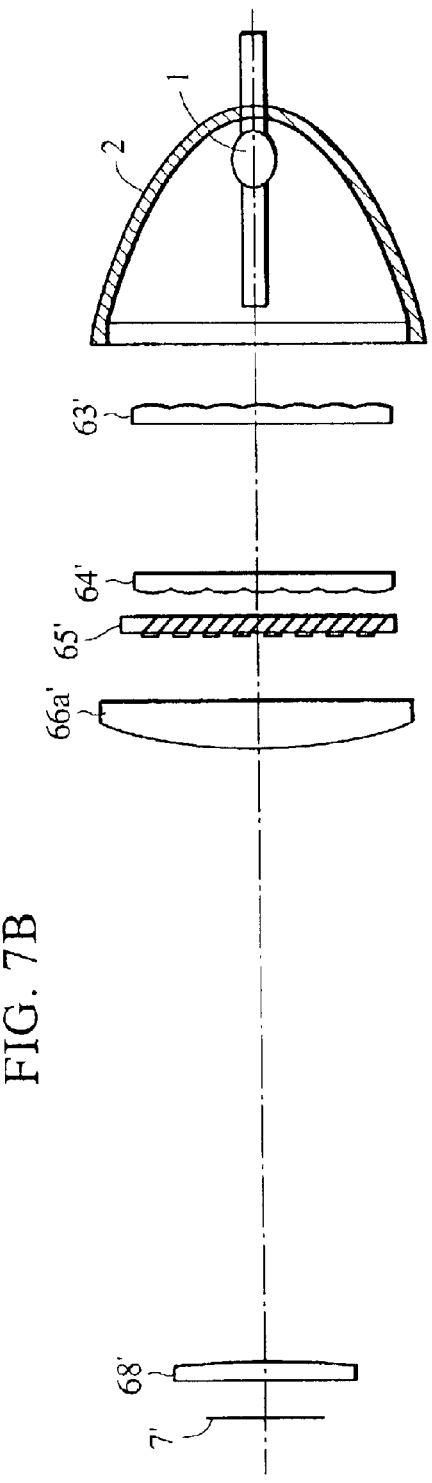
FIG. 7A
FIG. 7B

METHOD OF MANUFACTURING DIFFERENT TYPES OF IMAGE DISPLAY APPARATUSES AND IMAGE DISPLAY APPARATUS MANUFACTURED BY THE METHOD

BACKGROUND OF THE INVENTION

1. Field of the Invention

The present invention relates to an image projection apparatus such as a liquid crystal projector for magnifying an image formed by means of image display elements (liquid crystal panels) and displaying it on a projection surface such as a screen.

2. Description of the Related Art

Hitherto, image projection apparatuses for magnifying an image formed by means of image display elements (liquid crystal panels) and projecting it on a projection surface includes an illumination system for guiding light from a light source into the image display elements and a projection system for projecting the light from the image display elements onto a screen or the like by focusing the image thereon. FIG. 8 illustrates the configuration of an image projection apparatus using a crossdichroic prism. The configuration includes a light source (lamp) 101; a reflecting mirror 102; lens arrays 103 and 104 having a plurality of lenses; a polarization conversion element 105 for aligning unpolarized light rays in a predetermined polarization direction; a condenser lens 106 for focussing illumination light into a predetermined illumination area; reflecting mirrors 107a and 107b; dichroic mirrors 108 and 109 for separating white light into light of predetermined colors; image display elements 110G, 110B, and 110R; a relay optical system 111 having lenses 111a, 111b, and 111c, and mirrors 111d and 111e, for efficiently transmitting the illumination light to the image display elements 110G, 110B, and 110R over long optical paths; field lenses 112G and 112R for causing the illumination light to correctly enter the image display elements 110G and 110R; a color-combining prism 113 for directing the light from each of the image display elements 110G, 110B, and 110R onto one optical path; and a projection lens 114. Lenses composing the projection lens 114 are held in a lens holding section 115a, and the image display elements 110G, 110B, and 110R and the color-combining prism 113 are held in a holding section 115b. The light source (lamp) 101 that is mounted on the reflecting mirror 102 is held in a lamp holding section 115c, and other optical members are held in a lens barrel (optical element holding means) 115d.

In recent years, so-called image display elements with microlenses, which are provided with a micro lens for every pixel included therein in order to increase light efficiency, have come into widespread use. Generally, it is often the case that image display elements with microlenses are used when brightness is important and image display elements without microlenses are used when cost is important. In such a case, the same arrangements have been used for the illumination systems, which illuminate the image display elements, for both image display elements with microlenses and without microlenses.

Usually, because the illumination system is set so as to have the highest brightness, it is designed to be adaptable to the arrangement using the image display elements with microlenses, in which brightness is important. Since the microlenses have a function for focussing the light into pixel apertures of the image display elements, it is possible to decrease the amount of light loss at the pixel apertures when light rays incident on the microlenses are more parallel to each other. Thus, it is desirable that the illumination system has a larger F-number. A detailed description will be given with reference to FIG. 9. FIG. 9 illustrates the illumination system from the light source (lamp) 101 to the image display element, in which the mirrors and the dichroic mirrors in the optical system are omitted. Here, the F-number of the illumination system is the F-number of the luminous flux of the illumination light for the image display element. Provided that the F-number of the illumination system is represented by F, the pupil diameter of the illumination system is represented by Q, and the composite focal length of the condenser lens 106 and the field lens 112 is represented by f, the F is given by the following equation:

$F=f/Q.$

When a lens array having a predetermined size is used (Q is constant), it is necessary to increase the value of f in order to increase the value of the F-number for the illumination system (in order to darken the illumination system). Here, the pupil diameter Q for the illumination system is twice as large as the radius q of a circumcircle (shown by a dotted line) encompassing light source images I formed on the lens array 104, as shown in FIG. 10.

Another factor for determining the brightness of the illumination system is the polarization conversion element. In the polarization conversion element, the incident light rays are separated into polarization components P and S by a polarization beam splitter, and the polarization component S is reflected by a reflecting surface thereof so that the traveling direction of the polarization component S is made to be the same as that of the polarization component P. Provision of a ½ wave plate on an exit plane for the polarization component P causes the polarization component P to be converted into the polarization component S. Because one incident optical path is divided into two optical paths in the polarization conversion element as described above, the incident light rays must be spatially discrete luminous fluxes corresponding to incident apertures for the polarization conversion element, which are arranged in a stripe pattern. This is realized by the lens array 103 disposed at the incident side of the polarization conversion element 105 (referring to FIG. 9). The lens array has a configuration in which a plurality of lenses is two-dimensionally arranged. The light incident on the lens array is focussed on the optical axis of each lens composing the lens array. Setting the focal point of the light in close proximity to the polarization conversion element makes it possible to cause spatially discrete luminous fluxes corresponding to the incident apertures to be incident on the polarization conversion element. More light rays incident on the incident apertures A of the polarization conversion element allow the light efficiency in the polarization conversion element to increase, as shown in FIG. 11. To this end, it is necessary to reduce the area where the light is focussed at the lens array 103 (the area of the light source images I). Since the light source (lamp) 101 generally has a finite size, the light collimated by the reflecting mirror 102 is incident on the lens array 103 at a predetermined angle. Accordingly, the smaller the focal length of each lens composing the lens array 103, the smaller the area where the light is focussed, thus increasing the light efficiency. Provided that each of the lens apertures for the lenses composing the lens array 103 has a constant size, this corresponds to decreasing the F-numbers of the lenses composing the lens array 103.

The lens arrays 103 and 104 have a function of forming a uniform illumination area on the image display element. In order for the lens arrays to perform this function, the following condition must be met:

$$P/f \approx p/f2$$

where P represents the size of the uniform illumination area, f2 represents the composite focal length of the lens arrays, and p represents the size of each of the lenses composing the lens arrays, as shown in FIG. 9. Accordingly, the following condition is met:

$$F' = f2/p \approx f/P$$

where F' represents the F-number of a lens array unit. Because the size P of the illumination area is predetermined when the image display element has a predetermined size, it is necessary to decrease the value of f in order to decrease the value of the F-number F. This condition is incompatible with the condition described above. Thus, in practical optimization, the value of f is determined so as to obtain the maximum light efficiency by balancing the light efficiency in the microlenses with the light efficiency in the polarization conversion element.

In the image display element without microlenses, because high apparatus efficiency is obtained when the polarization conversion element has high efficiency, the illumination system optimized for the image display element with microlenses, as described above, is not optimal for the apparatus using the image display element without microlenses. Thus, this has caused a substantial decrease in brightness, compared with the image display element with microlenses.

SUMMARY OF THE INVENTION

Accordingly, it is an object of the present invention to provide an image display apparatus in which different types of illumination systems can be easily constituted in accordance with the characteristics of image display elements varying according to whether or not microlenses are used, and so on. This object is achievable by selectively using retainers for retaining optical elements included in the illumination system, when at least two different types of the illumination systems, varying according to whether or not microlenses are used, are constituted. In other words, an object of the present invention is to provide an image display apparatus in which, when conditions having some effect on the optical system vary (are changed) in the image display apparatus, the configuration of an optical system optimized for conditions before making changes can be achieved using a lens barrel (for holding the optical elements), a holding section, or a housing, which are substantially identical to those used in the configuration of the optical system optimized for conditions after making changes.

According to a first aspect of the present invention, there is provided a method of manufacturing different types of image display apparatuses. The method includes the steps of producing the lens barrel, which can also function as the housing, for holding the optical elements, which lens barrel is commonly usable in the different types of image display apparatuses; selecting one type of image display apparatus to be manufactured among the different types of image display apparatuses; and manufacturing the one type of image display apparatus using the common lens barrel (housing).

Preferably, the lens barrel includes a plurality of retainers for retaining the optical elements, and the number of the retainers is greater than the number of the optical elements.

The term "number of the retainers" may be construed to mean the total number of the optical elements that are retainable in the retainers.

Another type of image display apparatus, which is different from the one type of image display apparatus among the different types of image display apparatuses, can be preferably manufactured using the method.

The method may be such that each of the different types of image display apparatuses includes an illumination optical system for illuminating the image display element by light from a light source, and that F-number of the illumination optical system for the one type of image display apparatus is different from the F-number of the illumination optical system for the other type of image display apparatus, provided that the F-number of each of the illumination optical system is given by the following equation:

$$Fno = f/Q$$

where f represents the focal length of the illumination optical system and Q represents the diameter of a circle circumscribed about the coverage of illumination luminous fluxes, which is transmitted through the optical element disposed closest to the image display element among the optical elements having power in the illumination optical system.

Preferably, in the method, the following condition is met:

$$Fmax - Fmin > 0.3$$

where Fmax represents the maximum value and Fmin represents the minimum value among the F-numbers of the illumination optical systems for the different types of image display apparatuses.

Preferably, in the method, the following condition is met:

$$F1 > F2$$

where F1 represents the F-number of the illumination optical system for an image display apparatus in which microlenses are provided at the incident side of the image display element among the different types of image display apparatuses; and F2 represents the F-number of the illumination optical system for an image display apparatus in which microlenses are not provided at the incident side of the image display element among the different types of image display apparatuses.

The method may be such that the value Q of the illumination optical system for the one type of image display apparatus is substantially equal to that of the illumination optical system for the other type of image display apparatus, and that the value f of the illumination optical system for the one type of image display apparatus is different from that of the illumination optical system for the other type of image display apparatus.

Alternatively, the method may be such that the value f of the illumination optical system for the one type of image display apparatus is substantially equal to that of the illumination optical system for the other type of image display apparatus, and that the value Q of the illumination optical system for the one type of image display apparatus is different from that of the illumination optical system for the other type of image display apparatus.

Alternatively, the method may be such that the values f and Q of the illumination optical system for the one type of image display apparatus are different from the values f and Q of the illumination optical system for the other type of image display apparatus, respectively.

Preferably, in the method, the following condition is met:

$$0.9 < V1/V2 < 1.1$$

where V1 represents the volume of the lens barrel for the one type of image display apparatus and V2 represents the volume of the lens barrel for the other type of image display apparatus.

The method may be such that each of the different types of image display apparatuses includes the illumination optical system for illuminating the image display element by the light from the light source with approximately uniform illuminance.

The method may be such that each of the different types of image display apparatuses includes the illumination optical system for illuminating the image display element by telecentric luminous flux from the light source.

Alternatively, the method may be such that the lens barrel includes a plurality of retainers for retaining the optical elements, and that each of the different types of image display apparatuses includes at least two lens arrays having a plurality of lenses, a polarization conversion element for aligning incident light rays in a predetermined polarization direction, and a condensing optical element unit for focusing the incident light rays into a desired area on the image display element. Preferably, all of the two lens arrays, the polarization conversion element, and the condensing optical element unit are held by the retainers.

Preferably, the different types of image display apparatuses include the one type of image display apparatus and the other type of image display apparatus, and the following condition is met:

$$0.9 < V1/V2 < 1.1$$

where V1 represents the volume of the lens barrel for the one type of image display apparatus and V2 represents the volume of the lens barrel for the other type of image display apparatus.

The method may be such that the different types of image display apparatuses include the one type of image display apparatus and the other type of image display apparatus, and that the number of the optical elements included in the one type of image display apparatus is different from the number of the optical elements included in the other type of image display apparatus.

The method may be such that the different types of image display apparatuses include the one type of image display apparatus and the other type of image display apparatus, and that only one of the one type of image display apparatus and the other type of image display apparatus has a concave lens.

According to a second aspect of the present invention, there is provided an image display apparatus for illuminating an imaging element by the light from the light source and displaying an image, which includes optical elements and retainers for retaining the optical elements. The number of the optical elements retainable in the retainers in the image display apparatus is greater than the number of the optical elements included in the image display apparatus.

Preferably, the image display apparatus includes the illumination optical system for illuminating the imaging element by the light from the light source and a projection optical system for projecting the light from the imaging element onto a projection surface. It is also possible that the number of the optical elements included in the projection optical system is equal to the number of the optical elements retainable in the retainers in the projection optical system.

Preferably, the image display apparatus includes the illumination optical system for illuminating the imaging element by the light from the light source and the projection optical system for projecting the light from the imaging element onto the projection surface. It is also possible that the number of the optical elements included in the illumination optical system is smaller than the number of the optical elements retainable in the retainers in the illumination optical system.

In the image display apparatus, it is also possible that the number of the optical elements retainable in the retainers in the image display apparatus is greater than the number of the optical elements included in the image display apparatus by 1 to 4 elements.

Further objects, features and advantages of the present invention will become apparent from the following description of the preferred embodiments with reference to the attached drawings.

BRIEF DESCRIPTION OF THE DRAWINGS

FIGS. 1A and 1B are schematic sectional views showing illumination optical systems according to a first embodiment of the present invention.

FIGS. 3A and 3B are schematic sectional views showing illumination optical systems according to a second embodiment of the present invention.

FIGS. 4A and 4B are schematic sectional views showing illumination optical systems according to a third embodiment of the present invention.

FIGS. 5A and 5B are schematic sectional views showing illumination optical systems according to a fourth embodiment of the present invention.

FIGS. 6A and 6B are schematic sectional views showing illumination optical systems according to a fifth embodiment of the present invention.

FIGS. 7A and 7B are schematic sectional views showing illumination optical systems according to a modification of the fifth embodiment of the present invention.

DESCRIPTION OF THE PREFERRED EMBODIMENTS

First Embodiment

Figure 2:
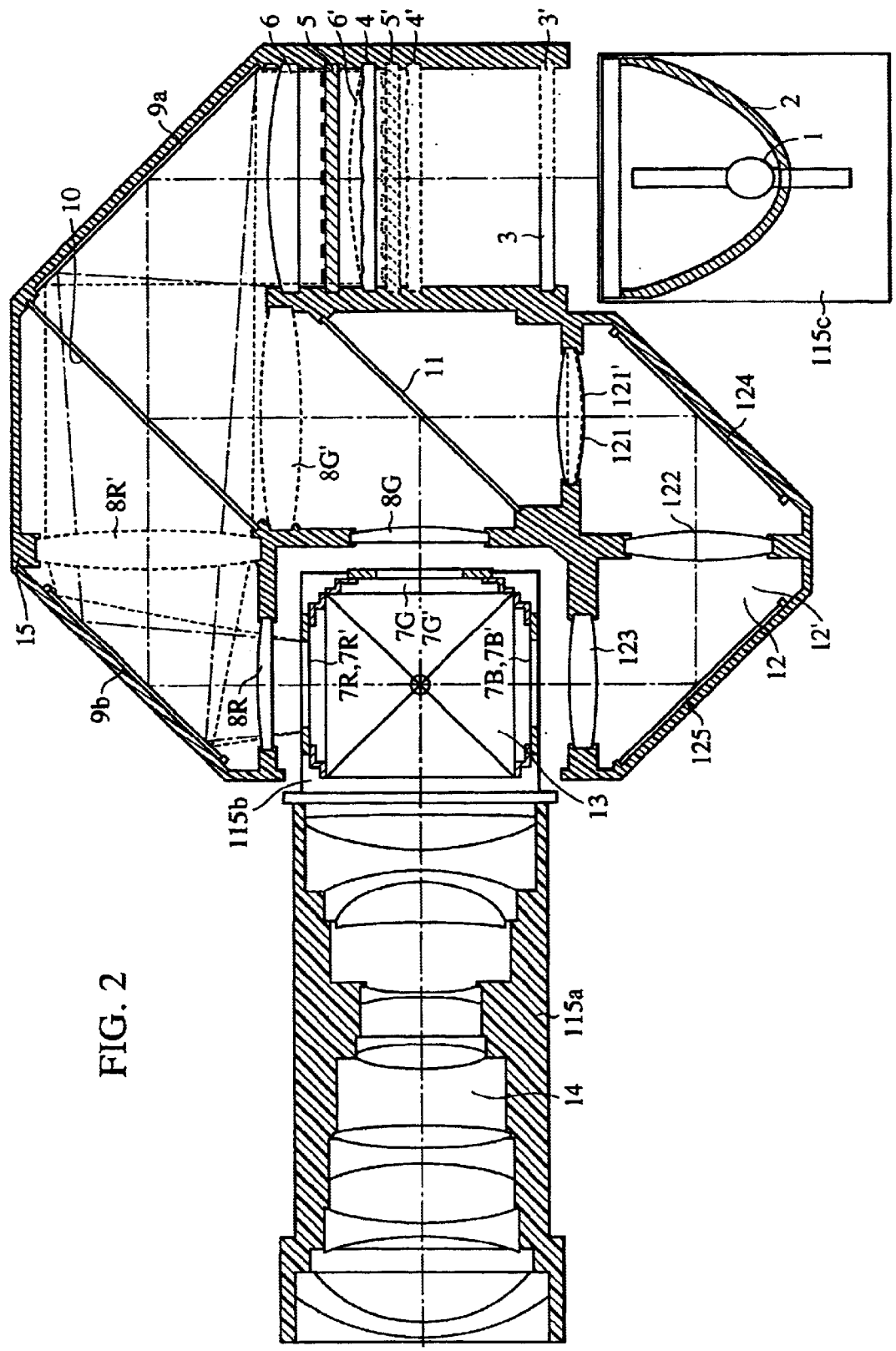
FIG. 2 is a sectional view showing a configuration according to a first embodiment of the present invention.
Figure 8:
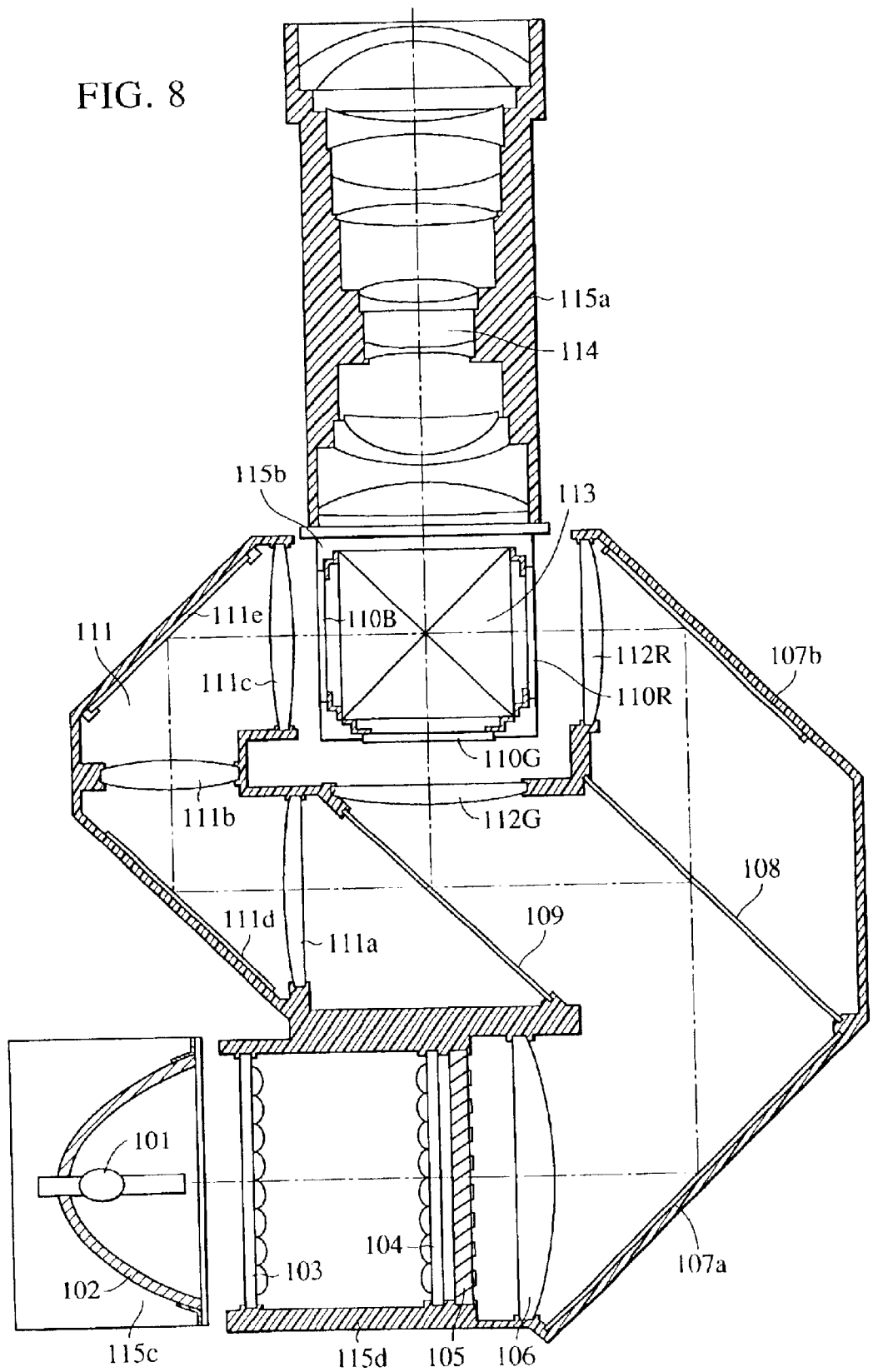
FIG. 8 is a sectional view showing the configuration of a conventional image projection apparatus.
Figure 9:
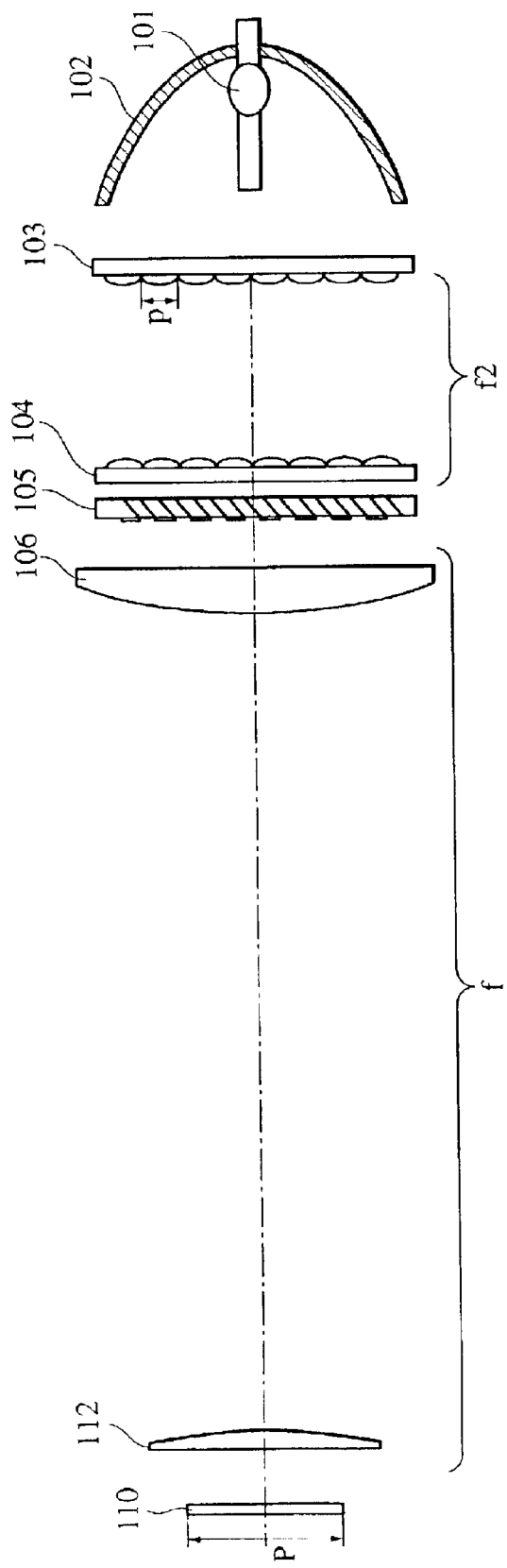
FIG. 9 is a schematic sectional view showing an optical system of the conventional example.
Figure 10:
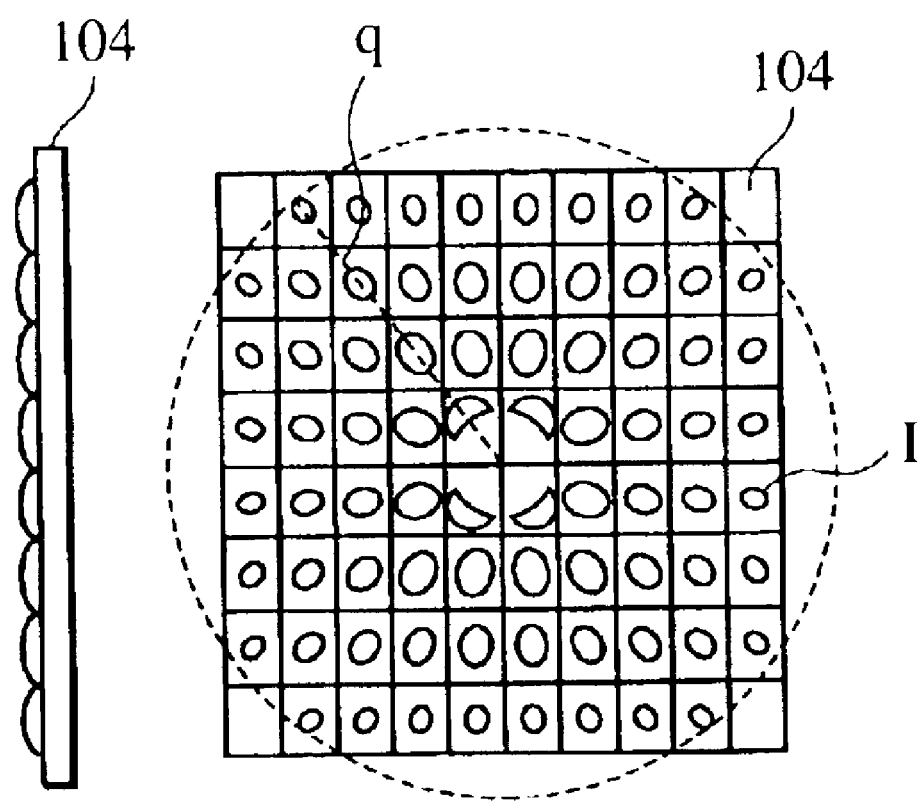
FIG. 10 is a diagram illustrating the conventional example.
Figure 11:
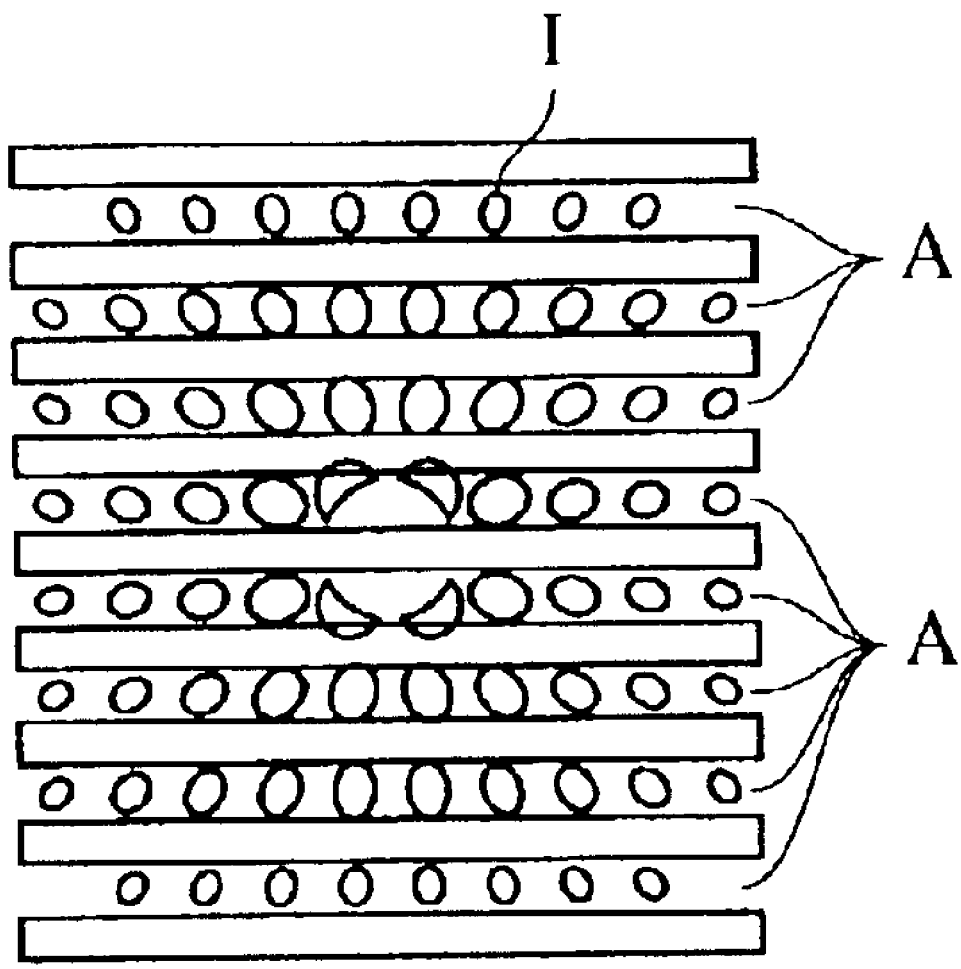
FIG. 11 is a diagram illustrating the conventional example.

An image display apparatus according to a first embodiment of the present invention will be described below with reference to FIGS. 1A and 1B. FIG. 1A illustrates the arrangement of an illumination system of an image display apparatus using an image display element with microlenses. FIG. 1B illustrates the arrangement of an illumination system of an image display apparatus using an image display element without microlenses. The illumination systems of the image display apparatuses shown in FIGS. 1A and 1B include a light source (lamp) 1; a reflecting mirror 2; lens arrays 3, 4, 3', and 4' having a plurality of lenses; a polarization conversion element 5 for aligning unpolarized light rays in a predetermined polarization direction; condenser lenses 6 and 6' for focussing illumination light into a predetermined illumination area; image display elements 7 and 7'; and field lenses 8 and 8' for causing the illumination light to correctly enter the image display elements 7 and 7'. Table 1 shows sample optical data for the illumination system shown in FIG. 1A and Table 2 shows sample optical data for the illumination system shown in FIG. 1B.

TABLE 1

|  | Radius of Curvature | Distance | Index of Refraction | Composite Focal Length |
|---|---|---|---|---|
| Lens Array 3 | 22 | 3 | 1.516 | 37.8 |
|  | ∞ | 33.85 | 1 |  |
| Lens Array 4 | ∞ | 3 | 1.516 |  |
|  | −19.6 |  | 1 |  |
| Condenser Lens 6 | ∞ | 6 | 1.658 | 153.3 |
|  | −109.5 | 152.7 | 1 |  |
| Field Lens 8 | 83.5 | 3 | 1.516 |  |
|  | ∞ | 6 | 1 |  |

TABLE 2

|  | Radius of Curvature | Distance | Index of Refraction | Composite Focal Length |
|---|---|---|---|---|
| Lens Array 3' | 17.6 | 3 | 1.516 | 29.4 |
|  | ∞ | 25.4 | 1 |  |
| Lens Array 4' | ∞ | 3 | 1.516 |  |
|  | −15.2 |  | 1 |  |
| Condenser Lens 6' | ∞ | 5.5 | 1.516 | 119.1 |
|  | −123.9 | 113 | 1 |  |
| Field Lens 8' | 174 | 8 | 1.713 |  |
|  | −174 | 57.6 | 1 |  |

In the arrangement shown in FIG. 1A, the composite focal length of the condenser lens 6 and the field lens 8 is 153.3 mm, and provided that the pupil diameter of the illumination light at the lens array 4 is 66 mm, the F-number F of the illumination system becomes 2.32. In the arrangment shown in FIG. 1B, the composite focal length of the condenser lens 6' and the field lens 8' is 119.1 mm, and provided that the pupil diameter of the illumination light at the lens array 4' is 66 mm, similar to FIG. 1A, the F-number F' of the illumination system becomes 1.80. Accordingly, an illumination system with higher brightness and having a smaller F-number can be formed by using the image display element without microlenses, thus attaining improved illumination optical efficiency. Upon investigation, the result is that the brightness of the illumination system in the arrangement shown in FIG. 1B can be increased by 15% or more, compared with the case where the image display element in the arrangement shown in FIG. 1A is simply replaced with one without microlenses. Also, the difference between the F-number F' and the F-number F is 0.52, so that the condition that the difference between the maximum value of the F-number and the minimum value of the F-number should be not less than 0.3 is met. The same effect as mentioned above can be obtained when arranging the illumination system in accordance with this condition. According to this embodiment, it is possible to selectively implement the arrangement of optical elements shown in FIG. 1A and that shown in FIG. 1B using lens barrels having substantially the same design.

FIG. 2 illustrates a configuration in which the arrangements of the optical elements in FIGS. 1A and 1B are selectively arranged in one lens barrel. In FIG. 2, the optical elements indicated by solid lines show those in FIG. 1A, and the optical elements indicated by dotted lines show those in FIG. 1B (reference numerals and symbols with a prime are used to indicate them). The configuration shown in FIG. 2 is a so-called triple-plate structure, which has, in addition to the optical elements shown in FIGS. 1A and 1B, optical elements for separating the light from the illumination system into light rays of three colors and combining them. The configuration includes reflecting mirrors 9a and 9b; dichroic mirrors 10 and 11 for separating white light into light of predetermined colors; image display elements for different colors 7G, 7B, and 7R and 7G', 7B' and 7R'; a relay optical system 12 having lenses 121, 121', 122, and 123, and mirrors 124 and 125, for efficiently transmitting colored light rays which travel along long optical paths; field lenses 8G and 8R, and 8G' and 8R' for causing the illumination light to correctly enter the image display elements; a color-combining prism 13 for directing the light from each of the image display elements into one optical path; and a projection lens 14. As shown in FIG. 2, a lens barrel 115a holds lenses composing the projection lens 14, and the color-combining prism 13 and image display elements 7G, 7B, and 7R and held in a holding section 115b. The optical elements in these two arrangements are held in the corresponding retainers in the lens barrel, or holder, 15. When different types of optical elements are to be held in the same position, the difference in shape can be accommodated by press-fitting, fixing via a spacer, or the like.

The same reference numerals and symbols as in the Description of the Related Art are used for a lens holding section for holding lenses composing the projection lens, a holding section for holding image display elements 7G, 7B, and 7R, and 7G', 7B' and 7R' and the color-combining prism 13, and a lamp holding section for holding the light source (lamp) 1, which is mounted on the reflecting mirror 2.

It is not necessary for the lens barrel used to be completely identical to each other and they may have slightly different shapes resulting from the addition or removal of some members thereof. Provided that the volume of the lens barrel holding the optical elements in FIG. 1A (with microlenses) is represented by Va1 and the volume of the lens barrel holding the optical elements in FIG. 1B (without microlenses) is represented by Vb1, these two lens barrels are considered to be substantially identical when they have substantially the same shapes and satisfy the following condition:

$$9/10 < Va1/Vb1 < 10/9.$$

Second Embodiment

An image display apparatus according to a second embodiment of the present invention will be described below with reference to FIGS. 3A and 3B. FIG. 3A illustrates the arrangement of an illumination system of an image display apparatus using an image display element with microlenses, as is the case with FIG. 1A. FIG. 3B illustrates the arrangement of an illumination system of an image display apparatus using an image display element without microlenses.

The illumination system of the image display apparatus shown in FIG. 3B includes a light source 1; a reflecting mirror 2; lens arrays 23' and 24' having a plurality of lenses; a polarization conversion element 25' for aligning unpolarized light rays in a predetermined polarization direction; a first condenser lens 26a' and a second condenser lens 26b' for focussing illumination light into a predetermined illumination area; an image display element 7'; and a field lens 28' for causing the illumination light to correctly enter the image display element. Optical elements in these two different arrangements shown in FIG. 3A or 3B are held in the corresponding retainers in a common lens barrel (not shown).

The two arrangements of the illumination systems, each of which has a different number of lenses, are shown in this second embodiment. In the arrangement shown in FIG. 3B, the second condenser lens 26b' is provided between the first condenser lens 26a' and the field lens 28'. Also, the composite focal length f of the condenser lenses 26a' and 26b' and the field lens 28' in FIG. 3B is set to be smaller than that of the illumination system using the image display element with microlenses shown in FIG. 3A, so that the F-number F' of the illumination system using the image display element without microlenses becomes smaller than that of the illumination system in FIG. 3A. Thus, higher light efficiency can be attained.

Third Embodiment

An image display apparatus according to a third embodiment of the present invention will be described below with reference to FIGS. 4A and 4B. FIG. 4A illustrates the arrangement of an illumination system of an image display apparatus using an image display element with microlenses. FIG. 4B illustrates the arrangement of an illumination system of an image display apparatus using an image display element without microlenses. The illumination systems of the image display apparatuses shown in FIGS. 4A and 4B include a light source 1; a reflecting mirror 2; lens arrays 33, 34, 33' and 34' having a plurality of lenses; polarization conversion elements 35 and 35' for aligning unpolarized light rays in a predetermined polarization direction; condenser lenses 36a and 36a' for focussing illumination light into a predetermined illumination area; a concave lens 36b; image display elements 7 and 7'; and field lenses 38 and 38' for causing the illumination light to correctly enter the image display element. Optical elements in these two different arrangements shown in FIG. 4A or 4B are held in the corresponding retainers in a common lens barrel (not shown).

In FIG. 4A, the focal length of the illumination system is set to be larger than that of the illumination system in FIG. 4B, while both systems have optical paths of the same length, by constituting the condenser lens so as to include the convex condenser lens 36a and the concave lens 36b. Thus, the illumination system in FIG. 4A is designed to be best suited to the image display element with microlenses.

In this third embodiment, the sizes of the lenses composing the lens arrays 33 and 34 in FIG. 4A are set to be smaller than the sizes of the corresponding lenses composing the lens arrays 33' and 34' in FIG. 4B. Also, the pitch between light-blocking portions arranged in a stripe pattern in the polarization conversion element 35 in FIG. 4A is set to be smaller than the pitch between the light-blocking portions arranged in a stripe pattern in the polarization conversion element 35' in FIG. 4B. Accordingly, the F-numbers of the illumination systems with respect to the image display elements can be varied while the lens array 33, the lens array 34, and the polarization conversion element 35 are arranged in approximately the same positions as the lens array 33', the lens array 34' and the polarization conversion element 35', respectively.

Fourth Embodiment

An image display apparatus according to a fourth embodiment of the present invention will be described below with reference to FIGS. 5A and 5B. FIG. 5A illustrates the arrangement of an illumination system of an image display apparatus using an image display element with microlenses. FIG. 5B illustrates the arrangement of an illumination system of an image display apparatus using an image display element without microlenses. The illumination systems of the image display apparatuses shown in FIGS. 5A and 5B, in which the identical reference numerals and symbols are used for the same parts as in the first embodiment, include a light source 1; a reflecting mirror 2; lens arrays 43 and 44 having a plurality of lenses; a lens array L having a plurality of concave lenses; a polarization conversion element 45 for aligning unpolarized light rays in a predetermined polarization direction; condenser lenses 46 and 46' for focusing illumination light into a predetermined illumination area; image display elements 7 and 7'; and field lenses 48 and 48' for causing the illumination light to correctly enter the image display element.

In the illumination systems according to this fourth embodiment, the lens arrays 43 and 44 can be commonly used for both the arrangement with microlenses and the arrangement without microlenses. In the arrangement of the illumination system using the image display element with microlenses, the lens array L having a plurality of concave lenses is added between the lens arrays 43 and 44, so that the composite focal length of a lens array unit is set to be larger than that of the arrangement without microlenses, thus obtaining the lens array unit of a larger F-number.

As for the condenser lens unit, another condenser lens 46b' is used in the arrangement in FIG. 5B while employing the condenser lens 46 in the arrangement with microlenses, and therefore the composite focal length of the condenser lenses and the field lens in the arrangement without microlenses is smaller than the composite focal length in the arrangement with microlenses. Accordingly, the F-numbers of the illumination systems in the two arrangements can be set to be different from each other, as described above, while using many common parts in the illumination systems.

Fifth Embodiment

An image display apparatus according to a fifth embodiment of the present invention will be described below with reference to FIGS. 6A and 6B. FIG. 6A illustrates the arrangement of an illumination system of an image display apparatus using an image display element with microlenses. FIG. 6B illustrates the arrangement of an illumination system of an image display apparatus using an image display element without microlenses. The illumination systems of the image display apparatuses shown in FIGS. 6A and 6B include a light source 1; a reflecting mirror 2; lens arrays 53, 54, 53' and 54' having a plurality of lenses; polarization conversion elements 55 and 55' for aligning unpolarized light rays in a predetermined polarization direction; a condenser lens 56 for focussing illumination light into a predetermined illumination area; image display elements 7 and 7'; and a field lens 58 for causing the illumination light to correctly enter the image display element.

The illumination systems according to this fifth embodiment are arranged, unlike the preceding embodiments, in such a manner that the composite focal length of the condenser lens 56 and the field lens 58 is identical in both arrangements and that the size of the lens array 54 is set to be smaller than that of the lens array 54', thus obtaining different pupil diameters for the illumination luminous flux in these two arrangements.

Referring to FIG. 6A, the lens array 53 has a surface 531 on which the lens array is formed and a convex surface 532. The illumination luminous flux is focussed owing to the effect of the convex surface, so that the size of the lens array 54 is smaller than that of the lens array 53. Each of the lenses composing the lens array 54 is eccentric relative to the lens apertures and converts the direction of the luminous flux so that the luminous flux focussed by the lens array 53 becomes telecentric relative to the polarization conversion element 55. Even optical elements having different sizes can be held in a common lens barrel (not shown) using any holding frame for holding the smaller lens array 54 and the polarization conversion element 55.

In a modification of the fifth embodiment of the present invention, it is possible to combine the lens array arrangement in which the illumination luminous flux is converged so as to decrease the pupil diameter of the illumination luminous flux with the arrangement in which the composite focal length of the condenser lens and the field lens varies, as shown in FIGS. 7A and 7B. Such a combination can increase the degree of freedom in design, thus obtaining a more suitable arrangement.

FIG. 7A illustrates the arrangement of an illumination system of an image display apparatus using an image display element with microlenses. FIG. 7B illustrates the arrangement of an illumination system of an image display apparatus using an image display element without microlenses.

The lens barrels used in all of the preceding five embodiments do not need to be completely identical and may have slightly different shapes resulting from the addition or removal of some members. Provided that the volume of the lens barrel holding the optical elements in the illumination system with microlenses is represented by Va and the volume of the lens barrel holding the optical elements in the illumination system without microlenses is represented by Vb, these two lens barrels are considered to be substantially identical when they have substantially the same shapes and satisfy the following condition:

$$9/10 < Va/Vb < 10/9.$$

Sixth Embodiment

Figure 12:
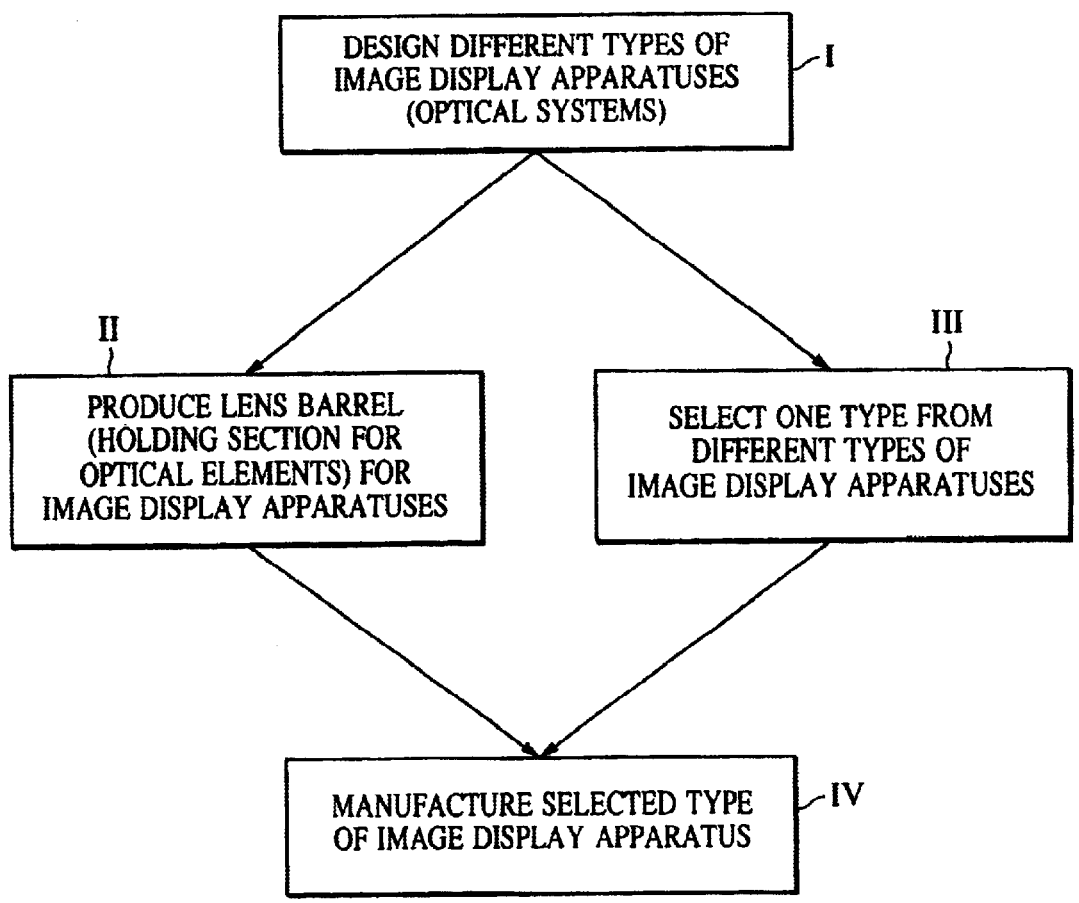
FIG. 12 a flow chart showing a method of manufacturing different types of image display apparatuses according to the present invention.

A description will be given of a method of manufacturing at least two types of image display apparatuses, as described in the preceding five embodiments, each of which has an optical system with a different arrangement, with reference to FIG. 12.

The first step involves designing different types of image display apparatuses, each of which has an optical system with a different arrangement. The second step involves designing a lens barrel which can accommodate any optical system that is suitable for each of the different types of image display apparatuses. That is, a lens barrel, which has the corresponding lens retainers (the retainers for optical elements) in all of the positions where the optical elements are held is designed and produced. The optical elements are arranged differently in each type of optical system. The third step involves selecting one type of image display apparatus from the different types thereof mentioned above. The fourth step involves manufacturing the image display apparatus in which the optical elements are held in the corresponding retainers in the lens barrel to construct an optical system that is suitable for the selected type of image display apparatus.

Incidentally, the second and third steps may be executed in reverse order or may be executed simultaneously.

The lens barrel, which has the lens retainers (the retainers for the optical elements), may also be used as a housing. Although two kinds of the optical system (image display apparatuses), in which the optical elements are arranged in different positions in the optical path from a light source to the image display element, that is, in an illumination optical system, are illustrated in the preceding five embodiments of the present invention, this sixth embodiment is not limited to an illumination optical system and may be applied to the optical path from the image display element to a projection surface such as a screen, that is, to a projection optical system.

In addition, although a crossdichroic prism, which is constructed in such a manner that dichroic reflection surfaces for combining colors intersect with each other, is used for a color-combining system in the triple-plate structure (FIG. 2) shown in the first embodiment, this embodiment is not limited to this structure. A structure employing, for example, a color-combining system using a dichroic prism in which the dichroic reflection surfaces do not intersect with each other, a dichroic mirror, a polarization beam splitter (PBS), and so on can be realized.

The image display apparatus according to the present invention has the retainers for retaining the optical elements such as the lenses and the dichroic mirror, which are included in the illumination optical system described above, at predetermined positions, and also has a lens holding section for holding the lenses included in the projection optical system. The image display apparatus of the present invention is constituted in such a manner that the lens barrel, the lens holding section, a power source, an image signal processing circuit, and the light source are encased in the housing. Accordingly, it is possible to use many common parts in products having different specifications by making the housing have substantially the same size even when using illumination systems in which optical elements are differently arranged. Therefore, it is possible to reduce the component cost.

In the preceding embodiments of the present invention, a plurality of optical elements in the illumination optical system are arranged differently in order to vary the F-numbers of the illumination optical systems. However, in addition to varying the F-numbers of the illumination optical systems, when the optical elements in the illumination optical system and the projection optical system can be arranged in several different positions in accordance with changes in conditions, for example, the light source, the image display element, the configuration of the projection optical system, or the indices of refraction or the dispersion of the optical elements, a lens barrel which accommodates the positions where the different types of the optical elements are arranged may be designed.

Furthermore, those embodiments of the present invention are not limited to the case where completely identical lens barrels are used in the different types of image display apparatuses. Lens barrels that are different in nonessential aspects, for example, lens barrels which have different part numbers assigned, which have a part thereof removed, or which have simple parts attached, are considered to be substantially identical. Therefore, the method of manufacturing the different types of optical systems and the different types of image display apparatuses using the lens barrels having substantially identical structures, and the optical systems and image display apparatuses manufactured thereby can be implemented within the scope of the present invention.

According to this embodiment of the present invention, it is possible to arrange the different types of optical elements in different ways in accordance with various demands, thereby making it possible to change the F-number of the illumination optical system without moving the retainers for retaining the lenses, re-mounting the retainers, or exchanging the housing.

When liquid crystal panels is used for the image display elements, the optimal illumination optical system can be incorporated without changing the positions of the retainers or changing the size of the overall apparatus in both configurations, that is, the configuration that provides microlenses for pixels of the liquid crystal panel in order to give priority to brightness and the configuration that does not provide microlenses for the pixels of the liquid crystal panel in order to give priority to cost. Thus, it is possible to offer the products, which provide higher brightness when giving priority to brightness and which do not cause brightness loss even when giving priority to cost.

While the present invention has been described with reference to what are presently considered to be the preferred embodiments, it is to be understood that the invention is not limited to the disclosed embodiments. On the contrary, the invention is intended to cover various modifications and equivalent configurations included within the spirit and scope of the appended claims. The scope of the following claims is to be accorded the broadest interpretation so as to encompass all such modifications and equivalent structures and functions.

What is claimed is:

1. A method of manufacturing different types of image display apparatuses, comprising the steps of:
producing a lens holder for holding optical elements, in which the lens holder is commonly usable in said different types of image display apparatuses;
selecting one type of image display apparatus to be manufactured among the different types of image display apparatuses; and
manufacturing the one type of image display apparatus using the common lens holder, wherein
the lens holder has a plurality of retainers for retaining the optical elements, with the number of optical elements retainable by the retainers being greater than the number of retained optical elements.

2. The method according to claim 1,
wherein another type of image display apparatus, which is different from the one type of image display apparatus among the different types of image display apparatuses, is manufactured using said method.

3. The method according to claim 2,
wherein each of the different types of image display apparatuses includes an illumination optical system for illuminating an image display element by light from a light source; and the F-number Fno of the illumination optical system for the one type of image display apparatus is different from the F-number of the illumination optical system for the other type of image display apparatus, wherein the F-number of each illumination optical system is given by the following equation:

$$Fno=f/Q,$$

where f represents the focal length of the illumination optical system and Q represents the diameter of a circle circumscribed about the coverage of illumination luminous flux, which is transmitted through the optical element that is disposed closest to the image display element among the optical elements having power in the illumination optical system.

4. The method according to claim 3,
wherein the following condition is met:

$$Fmax-Fmin>0.3$$

where Fmax represents the maximum value and Fmin represents the minimum value among the F-numbers of the illumination optical systems for the different types of image display apparatuses.

5. The method according to claim 3,
wherein the following condition is met:

$$F1>F2$$

where F1 represents the F-number of the illumination optical system for an image display apparatus in which microlenses are provided at the incident side of the image display element among the different types of image display apparatuses; and F2 represents the F-number of the illumination optical system for an image display apparatus in which microlenses are not provided at the incident side of the image display element among the different types of image display apparatuses.

6. The method according to claim 3,
wherein the value Q of the illumination optical system for the one type of image display apparatus is substantially equal to that of the illumination optical system for the other type of image display apparatus, and the value of the illumination optical system for the one type of image display apparatus is different from that of the illumination optical system for the other type of image display apparatus.

7. The method according to claim 3,
wherein the value f of the illumination optical system for the one type of image display apparatus is substantially equal to that of the illumination optical system for the other type of image display apparatus, and the value Q of the illumination optical system for the one type of image display apparatus is different from that of the illumination optical system for the other type of image display apparatus.

8. The method according to claim 3,
wherein the values f and Q of the illumination optical system for the one type of image display apparatus are different from the values f and Q of the illumination optical system for the other type of image display apparatus.

9. The method according to claim 3,
wherein the following condition is met:

$$0.9<V1/V2<1.1$$

where V1 represents the volume of the lens holder for the one type of image display apparatus and V2 represents the volume of the lens holder for the other type of image display apparatus.

10. The method according to claim 1,
wherein each of the different types of image display apparatuses includes an illumination optical system for illuminating an image display element by light from a light source with approximately uniform illuminance.

11. The method according to claim 1,
wherein each of the different types of image display apparatuses includes an illumination optical system for illuminating an image display element by telecentric luminous flux from a light source.

12. The method according to claim 1,
wherein the lens holder includes a plurality of retainers for retaining the optical elements, each of the different types of image display apparatuses includes at least two lens arrays having a plurality of lenses, a polarization conversion element for aligning incident light rays in a predetermined polarization direction, and a condensing optical element unit for focusing the incident light rays into a desired area on an image display element; and all of the at least two lens arrays, the polarization conversion element, and the condensing optical element unit are held by the retainers.

13. The method according to claim 1,
wherein the different types of image display apparatuses include the one type of image display apparatus and another type of image display apparatus; and the number of the optical elements included in the one type of image display apparatus is different from the number of the optical elements included in the other type of image display apparatus.

14. The method according to claim 1,
wherein the different type of image display apparatuses include a first type of image display apparatus and a second type of image display apparatus; and only one of the first or second types of image display apparatus has a concave lens.

15. A method of manufacturing different types of image display apparatuses, comprising the steps of:
producing a lens holder for holding optical elements, in which the lens holder is commonly usable in said different types of image display apparatuses;
selecting one type of image display apparatus to be manufactured among the different types of image display apparatuses;
manufacturing the one type of image display apparatus using the common lens holder; and
providing the lens holder with a plurality of retainers for retaining the optical elements, with the number of optical elements retainable by the retainers being greater than the number of retained optical elements,
wherein the different types of image display apparatuses include the one type of image display apparatus and another type of image display apparatus; and the following condition is met:

$0.9 < V1/V2 < 1.1$ where V1 represents the volume of the lens holder for the one type of image display apparatus and V2 represents the volume of the lens holder for the other type of image display apparatus.

16. An image display apparatus for illuminating an imaging element by light from a light source and displaying an image, comprising:
a lens holder;
optical elements;
retainers provided in said lens holder for retaining said optical elements,
wherein the number of optical elements retainable in said retainers is greater than the number of said optical elements retained;
an illumination optical system for illuminating the imaging element with light from the light source; and
a projection optical system for projecting the light from the imaging element onto a projection surface.

17. The image display apparatus according to claim 16,
wherein a number of optical elements included in said projection optical system is equal to the number of the optical elements retainable in said retainers in said projection optical system.

18. The image display apparatus according to claim 16,
wherein a number of optical elements included in said illumination optical system is smaller than the number of the optical elements retainable in said retainers in said illumination optical system.

19. The image display apparatus according to claim 16,
wherein the number of said optical elements retainable in retainers in said image display apparatus is greater than the number of said optical elements included in said image display apparatus by 1 to 4 elements.

20. A lens holder for an image display apparatus, comprising:
a lens housing;
optical elements;
retainers provided in said lens housing for retaining said optical elements,
wherein the number of optical elements retainable in said retainers is greater than the number of said optical elements retained.

* * * * *

UNITED STATES PATENT AND TRADEMARK OFFICE
CERTIFICATE OF CORRECTION

PATENT NO. : 6,890,079 B2
DATED : May 10, 2005
INVENTOR(S) : Atsushi Okuyama et al.

It is certified that error appears in the above-identified patent and that said Letters Patent is hereby corrected as shown below:

Column 8,
Line 36, "barrel" should read -- barrels --.

Column 15,
Line 14, "type" should read -- types --.

Signed and Sealed this

Second Day of May, 2006

JON W. DUDAS
*Director of the United States Patent and Trademark Office*